(12) United States Patent
Kenny et al.

(10) Patent No.: US 12,500,032 B2
(45) Date of Patent: Dec. 16, 2025

(54) MAGNETIC CORE WINDER FOR POWERLINE-MOUNTED DEVICES

(71) Applicant: Schweitzer Engineering Laboratories, Inc., Pullman, WA (US)

(72) Inventors: David Kenny, Pullman, WA (US); Brett Taggart, Moscow, ID (US); Timothy M. Minteer, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 624 days.

(21) Appl. No.: 18/052,395

(22) Filed: Nov. 3, 2022

(65) Prior Publication Data

US 2024/0153700 A1    May 9, 2024

(51) Int. Cl.
*H01F 41/074*   (2016.01)
*H01F 41/071*   (2016.01)
*H02J 50/00*    (2016.01)
*H02J 50/10*    (2016.01)

(52) U.S. Cl.
CPC .......... *H01F 41/074* (2016.01); *H02J 50/001* (2020.01); *H02J 50/10* (2016.02); *H01F 2041/0711* (2016.01)

(58) Field of Classification Search
CPC ...... G01R 15/183; G01R 1/22; G01R 15/186; G01R 1/18; G01R 21/00; G01R 15/14; G01R 31/085; G01R 19/00; H01F 27/23; H01F 38/14; H01F 38/30; H01F 2038/305; H01F 27/06; H01R 4/28; H01R 43/002; H01R 43/26; Y10T 29/49117

USPC ......................................................... 324/127
See application file for complete search history.

(56) References Cited

U.S. PATENT DOCUMENTS

| | | | |
|---|---|---|---|
| 2,191,393 A * | 2/1940 | Humphreys | H01F 30/10 242/129 |
| 3,453,726 A | 7/1969 | Roen | |
| 3,465,273 A | 9/1969 | Brock | |
| 3,566,462 A * | 3/1971 | Moore | H01F 41/08 29/605 |

(Continued)

FOREIGN PATENT DOCUMENTS

| | | |
|---|---|---|
| CN | 202473586 | 10/2012 |
| EP | 2993678 | * 3/2016 |

(Continued)

OTHER PUBLICATIONS

EP2993678 (Mar. 2016).*

*Primary Examiner* — Kenneth Whittington
(74) *Attorney, Agent, or Firm* — Fletcher Yoder, P.C.

(57) ABSTRACT

Systems and methods include using a magnetic core winder to install a powerline-mounted device with a non-gapped magnetic core, therefore reducing the weight of the powerline-mounted device while still harvesting equal or more power than a large cross-sectional and gapped magnetic cores. In particular, the methods include installing bobbin(s) and a core housing on a powerline and winding strip/ribbon core material onto the core housing. The bobbins may be wound axially opposed to on a toroid winder, which improves the accuracy of turns count of the magnetic core. The improved accuracy of turns count may increase the accuracy and/or tolerance of magnetic component(s) of the powerline-mounted device.

27 Claims, 11 Drawing Sheets

(56) References Cited

U.S. PATENT DOCUMENTS

| | | | | |
|---|---|---|---|---|
| 3,831,124 | A | * | 8/1974 | D'Alessio ............... H01F 38/30 335/298 |
| 4,381,600 | A | * | 5/1983 | Mas ........................ C22C 19/00 29/605 |
| 4,456,873 | A | | 6/1984 | Schweitzer |
| 4,635,055 | A | | 1/1987 | Fernandes |
| 4,782,582 | A | | 11/1988 | Venezia |
| 4,886,980 | A | * | 12/1989 | Fernandes ............ G01R 15/142 307/64 |
| 4,896,839 | A | * | 1/1990 | Curtis, Jr. ............. H01F 41/098 242/434.7 |
| 5,165,162 | A | | 11/1992 | Charles |
| 5,341,088 | A | | 8/1994 | Davis |
| 5,426,360 | A | | 6/1995 | Maraio |
| 5,483,215 | A | | 1/1996 | Mies |
| 5,537,089 | A | | 7/1996 | Greif |
| 5,550,476 | A | | 8/1996 | Lau |
| 5,565,783 | A | | 10/1996 | Lau |
| 5,656,931 | A | | 8/1997 | Lau |
| 5,729,125 | A | | 3/1998 | Schweitzer |
| 5,889,399 | A | | 3/1999 | Schweitzer |
| 5,990,674 | A | | 11/1999 | Schweitzer |
| 6,002,260 | A | | 12/1999 | Lau |
| 6,145,774 | A | * | 11/2000 | Courtney, Jr. ...... H01F 41/0233 29/605 |
| 7,227,441 | B2 | | 6/2007 | Skendzic |
| 7,312,686 | B2 | | 12/2007 | Bruno |
| 7,450,000 | B2 | | 11/2008 | Gidge |
| 7,474,192 | B2 | | 1/2009 | Skendzic |
| 7,626,794 | B2 | | 12/2009 | Swartzendruber |
| 7,795,994 | B2 | | 9/2010 | Radtke |
| 7,930,141 | B2 | | 4/2011 | Banting |
| 8,536,857 | B2 | | 9/2013 | Nero |
| 8,738,318 | B2 | | 5/2014 | Spillane |
| 9,182,429 | B2 | | 11/2015 | Saxby |
| 9,229,036 | B2 | | 1/2016 | Kast |
| 9,424,975 | B2 | | 8/2016 | Cook |
| 9,448,257 | B2 | | 9/2016 | Saxby |
| 9,838,896 | B1 | | 12/2017 | Barnickel |
| 9,915,680 | B2 | | 3/2018 | Khoshnood |
| 9,954,354 | B2 | | 4/2018 | Baker |
| 9,984,818 | B2 | | 5/2018 | Rumrill |
| 10,971,295 | B2 | | 4/2021 | Thomas |
| 11,152,152 | B2 | | 10/2021 | Thomas |
| 11,662,369 | B2 | | 5/2023 | Ryan |
| 2005/0237146 | A1 | | 10/2005 | Hirzel |
| 2006/0279910 | A1 | * | 12/2006 | Gunn ................... G01R 15/183 361/600 |
| 2008/0077336 | A1 | | 3/2008 | Fernandes |
| 2009/0115403 | A1 | | 5/2009 | Bernklau |
| 2009/0309754 | A1 | | 12/2009 | Bou |
| 2010/0084920 | A1 | | 4/2010 | Banting |
| 2010/0085036 | A1 | | 4/2010 | Banting |
| 2011/0025444 | A1 | | 2/2011 | Sugiyama |
| 2020/0176169 | A1 | | 6/2020 | Thomas |
| 2020/0335276 | A1 | | 10/2020 | Na |
| 2023/0110022 | A1 | | 4/2023 | Ryan |

FOREIGN PATENT DOCUMENTS

| | | |
|---|---|---|
| WO | 2014072063 | 5/2014 |
| WO | 2015136910 | 9/2015 |
| WO | 2015157296 | 10/2015 |

* cited by examiner

US 12,500,032 B2

MAGNETIC CORE WINDER FOR POWERLINE-MOUNTED DEVICES

BACKGROUND

This disclosure relates to systems and methods to create non-gapped magnetic cores for powerline-mounted devices. More particularly, this disclosure relates to using a magnetic core winder to facilitate installments of powerline-mounted devices in a non-invasive way.

An electrical power grid is an interconnected network for delivering electricity from producers to consumers. To monitor operation status and detect potential faults of the electrical power grid efficiently and safely, powerline-mounted devices, such as powerline sensors and faulted circuit indicators, are often installed on various powerlines. Such powerline-mounted devices often include gapped (e.g., air gapped) transformers (e.g., current transformers) or inductors built with cut/gapped magnetic cores. The gapped magnetic cores allow the powerline-mounted devices to be installed without de-energizing (e.g., powering off) the powerlines on which the powerline-mounted devices are to be mounted, thereby not interrupting the operations of the electrical power grid. However, the gaps of the magnetic cores may reduce magnetizing inductance that may inhibit (e.g., decrease) power harvesting capabilities and/or measurement (e.g., current, voltage, phase measurement) accuracy.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
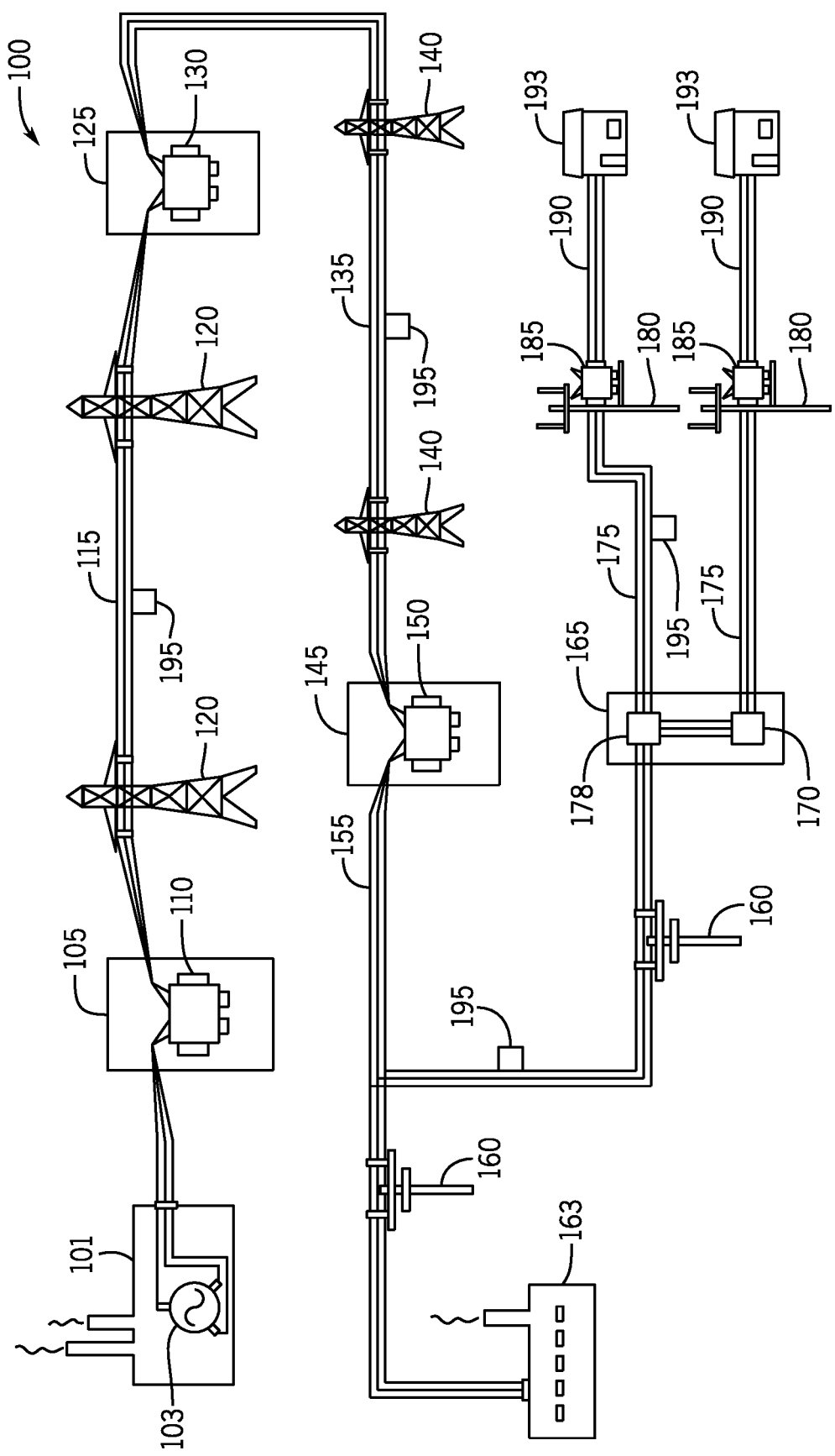
FIG. 1 is an example electric power system, including power generation, transmission, distribution, and monitoring, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Electric power system may generate, transmit, and/or distribute electric energy to loads. The electric power system may include electric generators, power transformers, conductors, circuit breakers, busses, regulators, capacitors, distribution transformers, loads, and so on. The electric power system may be monitored, controlled, automated, and/or protected (e.g., using intelligent electronic devices (IEDs)). Powerline-mounted devices (e.g., sensing devices, faulted circuit indicators) are used to provide various measurements (e.g., current, voltage, phase measurements) to facilitate the monitoring, control, automation, and protection associated with the electric power system and components.

Many powerline-mounted devices include magnetic cores that may be mounted on various conductors (e.g., powerlines) of the electric power system, such as transmission conductors, distribution conductors, secondary conductors, bus bars, and the like. The magnetic cores may be used to harvest electric energy from a magnetic field produced by the conductors on which the magnetic cores are mounted. For example, certain powerline-mounted devices, such as faulted circuit indicators, may harvest electric energy (e.g., a few milliwatts) from magnetic and electric fields produced (e.g., via inductions) by transmission or distribution conductors carrying currents (e.g., a few amperes). The harvested electric energy may be stored in storage components (e.g., capacitors) to power a load, such as a microcontroller, radio, and other circuitry to transmitting data (e.g., instantaneous fault current data) to a receiving device (e.g., a receiver). In some embodiments, the stored energy may also be used to trip or reset certain components in the powerline-mounted devices depending on current conditions of the conductors on which the powerline-mounted devices are installed.

In some cases, current transformers based on gapped magnetic cores are often used in the powerline-mounted devices that allow users (e.g., utility companies) to install such devices without taking the powerlines out of service, avoiding service interruptions and/or considerable economic loss. However, the addition of gaps (e.g., air gaps) to the current transformer cores inhibit magnetizing inductances, thereby reduce measurement (e.g., current measurement) accuracy and electric power harvesting capability of the powerline-mounted devices because, for example, a magnetizing current is larger than that of a non-gapped magnetic core, delivering less current to a load.

In some cases, large cross-sectional, gapped magnetic cores may be used in the powerline-mounted devices to compensate for inhibited magnetizing inductances and increase the measurement accuracy or harvested power. However, such large cross-sectional magnetic cores may be heavy and difficult to install on powerlines. Moreover, large cross-sectional magnetic cores may be limited in the amount of harvested power from magnetic fields at low primary currents.

To overcome the problems associated with gapped magnetic cores described above, non-gapped magnetic cores may be used in the powerline-mounted devices. Embodiments of the present disclosure are generally directed towards systems and methods using a magnetic core winder to install a powerline-mounted device with reduced cross-sectional area of the magnetic core, therefore reducing the weight of the powerline-mounted device while still harvesting equal or more power than the large cross-sectional and gapped magnetic cores.

For example, the disclosed methods include installing bobbin(s) and a core housing on a powerline and winding strip/ribbon core material onto the core housing, which may be similar to a Video Home System (VHS) or cassette tape being wound from one spool to the other. The bobbins may be wound axially opposed to on a toroid winder, which improves the accuracy of turns count of the magnetic core and simplifies manufacture of the magnetic core. The improved accuracy of turns count increases the accuracy and/or tolerance of magnetic component(s) of the powerline-mounted device.

The magnetic core winder discussed in the present disclosure may be used in various applications where the powerline-mounted devices are installed on conductors that cannot be opened. In some embodiments, the magnetic core winder may be expanded to applications that relies on very high measurement accuracy, such as bushing transformers, current transformers, voltage transformers, and so on.

With foregoing in mind, turning now to the figures, FIG. 1 illustrates a simplified diagram of an embodiment of an electric power system 100. For example, the electric power system 100 may generate, transmit, and/or distribute electric energy to loads. Typically, the electric power system 100 may include: generating stations that produce electric power; electrical substations for stepping electrical voltage up for transmission, or down for distribution; high voltage transmission lines that carry power from distant sources to demand-centers; and distribution lines that connect individual customers. Power stations may be located away from heavily populated areas, for instance near a fuel source or at a river/reservoir dam. The electric power generated is stepped up to a higher voltage at which it connects to an electric power transmission network. The transmission network moves the power long distances until it reaches regional electric power distribution network. On arrival at a substation, the power is stepped down from a transmission level voltage to a distribution-level voltage. As it exits the substation, it enters the local distribution network. Finally, upon arrival at the service location, the power is stepped down again from the distribution voltage to the required service voltage.

As illustrated, the electric power system 100 includes electric power generating station 101 where an electric generator 103 is installed. The electric power system 100 may also include transmission station 105 where a step-up power transformer 110 is installed. The electric power system 100 may also include primary transmission lines 115, towers 120, and a receiving station 125, which may include a step-down power transformer 130. Following the step-down power transformer 130, secondary transmission lines 135 and towers 140 may deliver power to a primary distribution station 145 that may include a power transformer 150. In the same manner as described above, the power transformer 150 may supply power to primary distribution lines 155 that may be physically lifted from the ground using poles 160. Power may then be provided to industrial consumers 163 and a secondary distribution station 165, which may include circuit breakers 170 to control the flow of power in the system. Finally, secondary distribution lines 175 coupled to poles 180 may distribute power to pole-mounted distribution transformers 185, such that local distribution lines 190 may provide power to residential consumers 193. Although not shown, it should be noted that a variety of other types of equipment may also be included in electric power system 100, such as voltage regulators, capacitors, capacitor banks, and suitable other types of equipment useful in power generation, transmission, and/or distribution.

The electricity that power plants (e.g., the electric power generating station 101) generate is delivered to customers over transmission and distribution systems. It is well established that high-voltage, low-current transmission results in lower power line losses. Therefore, higher voltage electricity is more efficient and less expensive for long-distance electricity transmission, while lower voltage electricity is safer for use in homes and businesses.

As can be seen from above, the electric power system 100 may consist of a primary transmission system and a secondary transmission system. The primary transmission system (e.g., including transmission station 105, lines 115 and towers 120) may provide electricity at a high voltage (normally above 100 kV) over long distance from generating station to regional secondary transmission system(s). The step-up power transformer 110 in transmission station 105 may increase voltages (e.g., around 20 kV) to transmission voltages (e.g., above 100 kV such as 230 kV, 500 kV, or even higher). The secondary transmission (e.g., including receiving station 125, lines 135 and towers 140) may provide electricity at medium voltages from transmission system to distribution systems. At receiving station 125, the step-down power transformer 130 may decrease transmission voltages to lower levels (e.g., 34.5 kV, 46 kV, and 69 kV). At this stage, large industrial customers (not illustrated here) may connect directly to this sub-transmission system.

A power distribution system may provide electricity from transmission systems to local customers. It may consist of the primary distribution system and the secondary distribution system, as described above. In one embodiment, the primary distribution system may include primary distribution station 145, lines 155, and poles 160. On arrival at the primary distribution station 145, power is stepped down from a transmission level-voltage to a distribution-level voltage (e.g., 11 kV or 13 kV) by the power transformer 150. As the primary distribution station 145 outputs the electricity, the electricity then conducts through the distribution wiring. At this stage, a medium industrial customer (e.g., such as industrial consumers 163) may connect directly to the distribution wiring. The secondary distribution system may include the secondary distribution station 165, circuit breakers 170, lines 175, and poles 180. In addition, the secondary distribution system may also include pole-mounted distribution transformer 185 and local distribution lines 190. At the secondary distribution station 165, circuit breakers 170 may control the flow of electricity among distribution lines. Finally, upon arrival at the service location, the voltage is stepped down further from the distribution voltage to the service voltages (e.g., 120 V, 240 V, and 480 V) using the pole-mounted distribution transformer 185.

As discussed in preceding sections, power transformers adjust the electric voltage to a suitable level on each segment of the electric power system 100 from the generator to the end user. Power transformers step up voltage at generation for efficient, long-haul transmission of electricity and step the voltage down for distribution to the level used by customers. Power transformers are also used to step the voltage either up or down at various points where there is a change in voltage in the electric power system 100. As such, the power transformers assist the electric power system 100 to efficiently and effectively provide power to various consumers.

The size of a power transformer may be determined by a primary (input) voltage, a secondary (output) voltage, and a load capacity measured in volt-ampere (VA). In addition to the load capacity rating, voltage ratings are often used to describe different classes of power transformers. For example, large power transformers (LPTs) with voltage ratings of 115 kV and above are considered high voltage (HV), and LPTs with voltage ratings of 345 kV and above are considered extra high voltage (EHV). Power transformers can carry a substantial amount of electricity. Therefore, a faulty or damaged transformer can affect the transmission/distribution capacity of a regional electric power grid, possibly leading to extended power outages. By monitoring the transformer operating status using transformer controller, which may consist of various sensors, meters, current transformers, load tap changers, and intelligent electronic devices, regional power system operators may predict when a single LPT in a substation may go offline and may perform some corrective actions to compensate for the expected loss of power.

As illustrated, the electric power system 100 includes powerline-mounted devices 195 that includes magnetic cores mounted on different conductors (e.g., transmission conductors, distribution conductors, secondary conductors, bus bars, and the like) of the electric power system. For example, the powerline-mounted devices 195 may include various power sensing devices (e.g., current sensors), faulted circuit indicators, fast tripping/resetting devices, and so on. In some embodiments, the powerline-mounted devices 195 may include current transformers containing magnetic cores used to harvest electric energy from magnetic fields produced by the conductors on which the powerline-mounted devices 195 are mounted.

Figure 2:
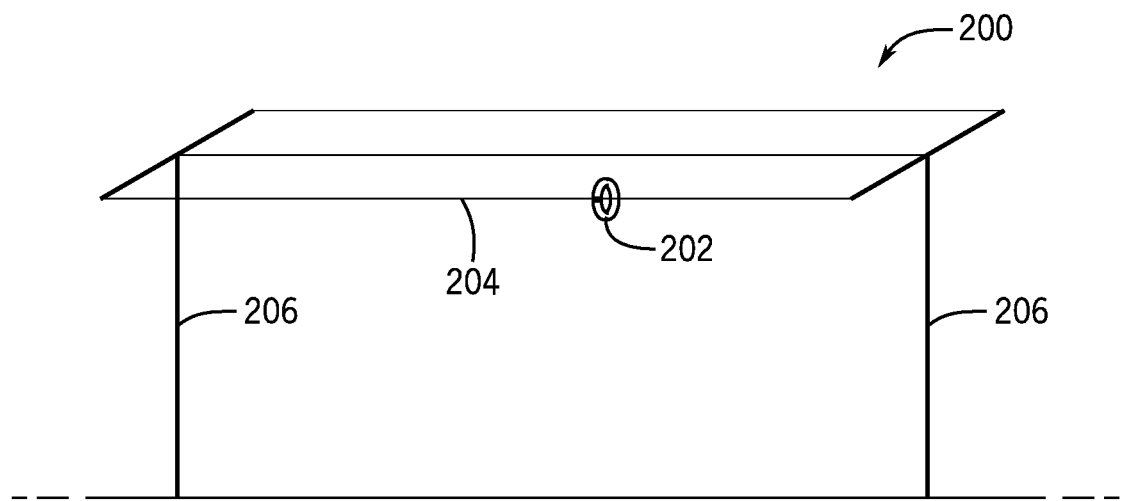
FIG. 2 is a simplified section of the electric power system of FIG. 1 with a gapped current transformer dispersed therein, in accordance with an embodiment.

In some embodiments, the powerline-mounted devices 195 may include a transformer. FIG. 2 is a simplified section 200 of the electric power system 100 of FIG. 1 with a gapped current transformer 202 dispersed therein. The gapped current transformer 202 may be mounted on a conductor 204 of multiple primary conductors installed between two electric posts 206 (e.g., tower 124 or 140, pole 160 or 180). The gapped current transformer 202 may use a gapped magnetic core to harvest electric energy from the conductor 204 based on electromagnetic or magnetic induction produced by a current passing through the conductor 204. The addition of the gapped magnetic core reduces magnetizing inductances, which may reduce measurement (e.g., current measurement) accuracy and electric power harvesting capability of the gapped current transformer 202. As mentioned above, increasing the size of cross-sectional area of the gapped core may compensate for reduced inductances, but may also increase the weight of the gapped current transformer 202.

Figure 3:
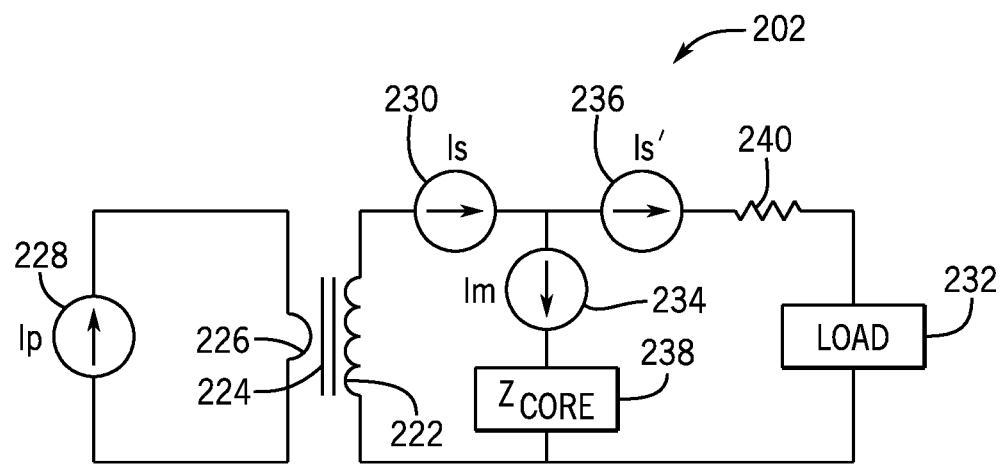
FIG. 3 is a schematic circuit diagram of a current transformer, in accordance with an embodiment.

FIG. 3 is a schematic circuit diagram of a current transformer (e.g., the gapped current transformer 202, or a non-gapped current transformer described below). The gapped current transformer 202 may include a secondary coil 222 formed by installing a gapped magnetic core 224 on a conductor 226 (e.g., primary conductor 204) and add winding material (e.g., copper wires) on the gapped magnetic core 224. When an alternating current, such as a primary current 228 (Ip), passes through the conductor 226, the primary current 228 produces an alternating magnetic field. The secondary coil 222 converts or transforms alternating magnetic field into electrical power that may be used to power a load 232. The secondary coil 222 creates a secondary current 230 (Is), which splits into a magnetizing current 234 (Im) and a load current 236 (Is').

In an ideal current transformer, a core impedance 238 (Zcore) is infinite, allowing all the primary current 228 to be scaled (e.g., based on transformer turns ratio) to the load current 236 (because the magnetizing current 234 is zero when the Zcore is infinite) delivered to the load 232. However, in a non-ideal current transformer (e.g., the gapped current transformer 202), the core impedance 238 is finite (e.g., including a magnetizing inductance Lm and a resistive element 240 representing various core loss parameters). In some cases, adding a gap to a magnetic core may significantly decrease the magnetizing inductance Lm. The Lm for a gapped current transformer may be calculated using a magnetizing inductance equation:

$$L_m = \frac{N_s^2}{\frac{L_e}{A_e \cdot \mu_0 \cdot \mu_1} + \frac{L_g}{A_e \cdot \mu_0}} \tag{1}$$

where Ns is the number of turns of the secondary coil 222, Le is the effective path length, Ae is the effective cross-sectional area of the gapped magnetic core 224, $\mu_o$ is the vacuum permeability, $\mu_r$ is the relative permeability of the core material (e.g., amorphous alloy, ferromagnetic metal such as iron, or ferromagnetic compounds such as ferrites), and Lg is the gap inductance.

Several entities have tried different options to improve the magnetizing inductance Lm of a gapped core. Such options include increasing the effective cross-sectional area (Ae) of the gapped magnetic core 224, increasing the relative permeability of the core material ($\mu_r$), or increasing the number of secondary turns (Ns). However, these options have certain drawbacks. For example, increasing the Ae may increase the weight of the gapped current transformer 202 that may be difficult to install with a tool (e.g., hot stick). Using a core material with a higher $\mu_r$ may increase the cost of the gapped current transformer 202. Increasing $N_s$ may decrease the secondary current 230 (Is) and may include a process of optimizing the secondary turns (Ns) to find a suitable medium between an ideal secondary current and an magnetizing inductance impedance.

Figure 4:
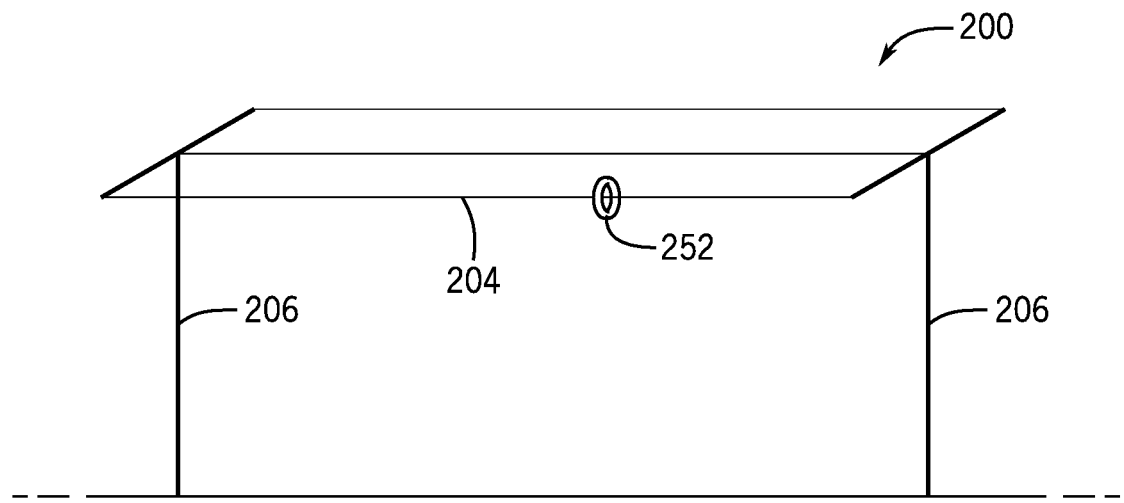
FIG. 4 is a simplified section of the electric power system of FIG. 1 with a non-gapped current transformer dispersed therein, in accordance with an embodiment.

To overcome the drawbacks of the gapped current transformer 202 and increase the magnetizing inductance Lm (thereby increasing the load current 236), a non-gapped current transformer may be used in the electric power system 10. FIG. 4 is a simplified section 200 of the electric power system 100 of FIG. 1 with a non-gapped current transformer 252 dispersed therein. The non-gapped current transformer 252 may be mounted on the conductor 204 of multiple primary conductors installed between the two electric posts 206. The non-gapped current transformer 252 may use a non-gapped magnetic core to harvest electric energy from the conductor 204 based on electromagnetic or magnetic induction produced by a current passing through the conductor 204. Using the non-gapped magnetic core removes the gap from the equation (1) (gap inductance Lg is zero), thereby increasing the magnetizing inductance Lm.

Additionally, using the non-gapped magnetic core may allow for installing a powerline-mounted device (e.g., non-gapped current transformer 252) with reduced cross-sectional area of the magnetic core, therefore reducing the weight of the powerline-mounted device. The powerline-mounted device may harvest equal or more energy than a device with a larger cross-sectional and gapped magnetic cores, therefore delivering equal or more current (e.g., load current 236 (Is')) to a load.

Figure 5:
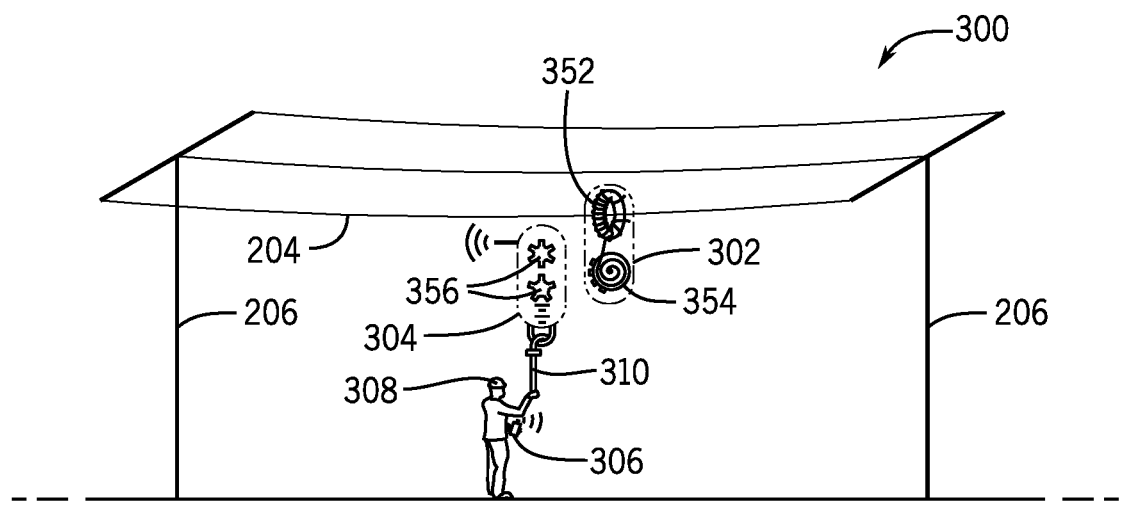
FIG. 5 is a schematic diagram of a mounting system for installing a powerline-mounted device including the non-gapped current transformer of FIG. 4, in accordance with an embodiment.

To avoid taking a conductor (e.g., conductor 204) out of service and opening the conductor to slide a non-gapped powerline-mounted device (e.g., non-gapped current transformer 252) on the conductor, certain mounting or installation systems/tools may be used. FIG. 5 is a schematic diagram of a mounting system 300 for installing a powerline-mounted device including the non-gapped current transformer 252 of FIG. 4. The mounting system 300 includes three devices: a line mounted device 302, an interface device 304, and a wireless control device 306. A user 308 (e.g., utility lineman) may use a hot stick 310 coupled to the interface device 304 to install the line mounted device 302 on the conductor 204 between two electric posts 206. The user 308 may also use the wireless control device 306 to remotely control installation processes and avoid certain operations, such as climbing up the electric posts 206 or using a lifting cart to be close to the conductor 204. The interface device 304 and the wireless control device 306 may be reusable for installing other powerline-mounted devices.

The line mounted devices 302 may include a spool 352 storing magnetic core material (e.g., ferromagnetic metal ribbon or strip made by amorphous alloy, ferromagnetic meta, or the like) and a magnetic core casing 354 to enclose a magnetic core (e.g., non-gapped magnetic core). The interface device 304 may include winding gears 356 that are arranged (e.g., adjusted) such that, when moving the interface device 304 over the line mounted device 302, the winding gears 356 align with the spool 352 and the magnetic core casing 354. The user 308 may use the wireless control device 306 to send a command to the line mounted device 302 to lock the winding gears 356 to the spool 352 and the magnetic core casing 354. The user 308 may use the wireless control device 306 to send a subsequent command to one or two winding motors of the interface device 304 to drive the winding gears 356 to rotate. Subsequently, the rotations of the winding gears 356 drive the spool 352 and the magnetic core casing 354 to rotate, thereby pulling the magnetic core material from the spool 352 and winding the magnetic core material into the magnetic core casing 354 to construct the magnetic core. Additional details related to the line mounted devices 302, the interface device 304, and the wireless control device 306 will be described below with reference to FIGS. 6-11.

It should be noted that the components described above with regard to the mounting system 300 are examples and the mounting system 300 may include additional or fewer components relative to the illustrated embodiment. For example, the mounting system 300 may include additional wireless control device(s) allowing additional user(s) to assist the user 308 during the installation of the line mounted device 302.

Figure 6:
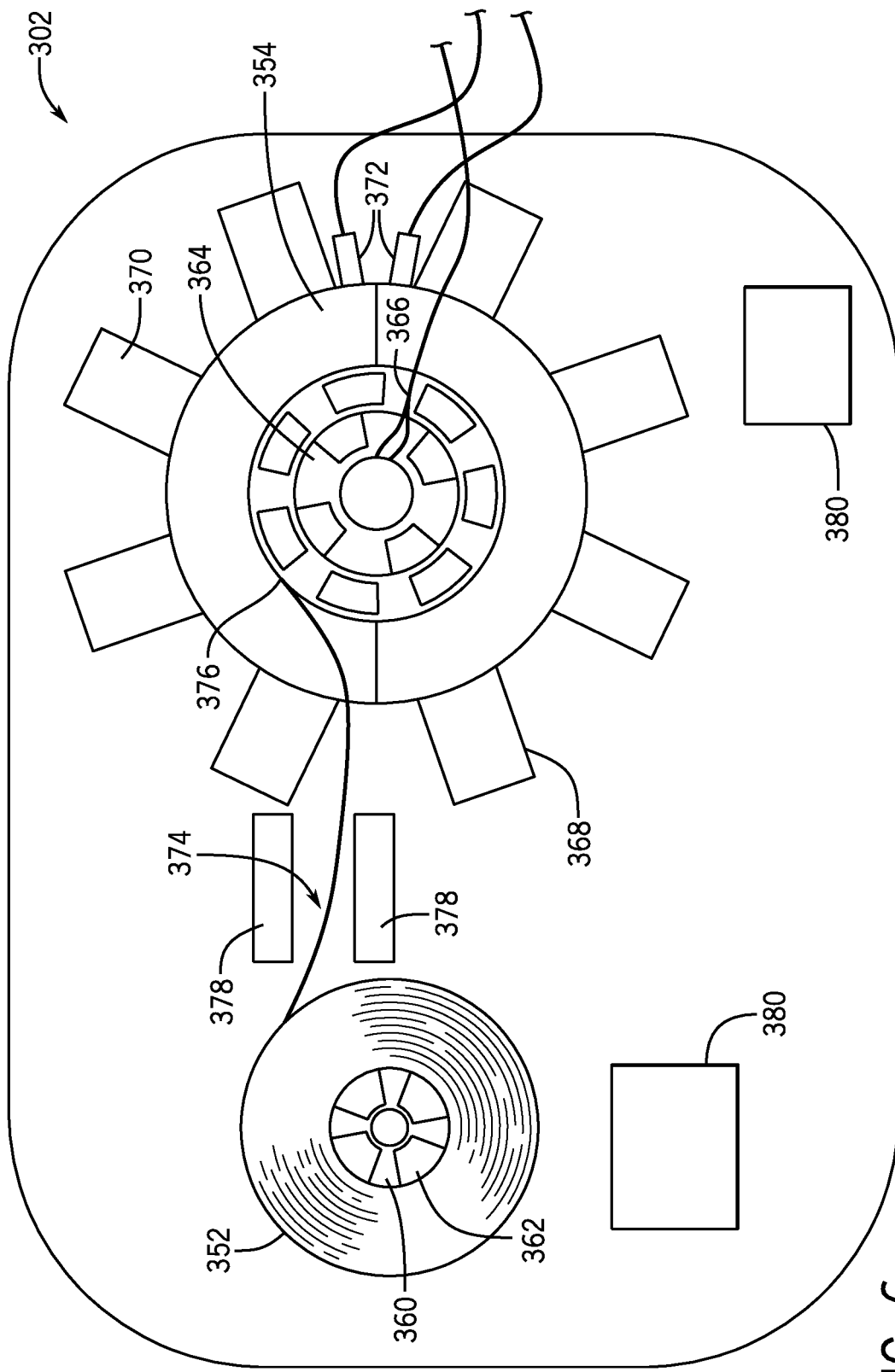
FIG. 6 is a block diagram of the powerline-mounted device of FIG. 5, in accordance with an embodiment.

FIG. 6 is a block diagram of the line mounted device 302 of FIG. 5. The line mounted device 302 includes the spool 352 and the magnetic core casing 354. The spool 352 houses the magnetic core material (e.g., ribbon or strip made by amorphous alloy, ferromagnetic metal, or the like). The spool 352 is coupled to a spool winding gear 360. The spool winding gear 360 may include a holding component 362 to hold the magnetic core material in place for certain operations (e.g., unwinding the magnetic core material construct the magnetic core casing 354). The magnetic core casing 354 is coupled to a casing winding gear 364. In one embodiment, one winding gear 356 may engage (e.g., enter or couple to) and rotate the spool winding gear 360 and another winding gear 356 may engage and rotate the casing winding gear 364. Both the magnetic core casing 354 and the casing winding gear 364 include an opening 366 for a conductor (e.g., conductor 204) when installing the line mounted device 302 on the conductor, thereby avoiding certain operations such as taking the conductor out of service and opening the conductor to slide line mounted device 302 on the conductor. The line mounted device 302 also includes a hinge 368 for opening the magnetic core casing 354 and the casing winding gear 364. Furthermore, the line mounted device 302 includes a secondary winding 370 (e.g., secondary coil 222) and secondary winding holding components 372 to hold the secondary winding in place after installing the secondary winding 370.

Additionally, the line mounted device 302 includes core material 374 stored in the spool 352. The core material 374 may enter the magnetic core casing 354 at a core material starting point 376. The line mounted device 302 also includes core material guides 378 to align the core material 374 during an installation. Further, the line mounted device 302 includes a first locking mechanism including one or more locking components 380 for connections to the interface device 304.

During the installation of the line mounted device 302, the user 308 may lock the line mounted device 302 to the interface device 304 using the locking components 380, position the line mounted device 302 close to the conductor 204, open the magnetic core casing 354 and the casing winding gear 364 using a gear driving system and the hinge 368, slide the line mounted device 302 on the conductor 204, close magnetic core casing 354 and the casing winding gear 364, and start rotating (e.g., using motors) the winding gears 356 of the interface device 304 to drive the winding gear 360 and the casing winding gear 364 to rotate, thereby pulling the core material 374 out of the spool 352 and winding the core material 374 into the magnetic core casing 354 to construct the magnetic core.

It should be noted that the components described above with regard to the line mounted device 302 are examples and the line mounted device 302 may include additional or fewer components relative to the illustrated embodiment. For example, the line mounted device 302 may include a power storage unit (e.g., rechargeable battery to store energy harvested from the conductor 204), processing unit (e.g., processor to analyze current measurement), communication unit (e.g., wireless transceiver to transmit/receive data), locating unit (e.g., GPS sensor), and the like. In some embodiments, the line mounted device 302 may not include the core material guides 378. In some embodiments, the spool 352 may be fixed and the core material 374 is pulled out when rotating the magnetic core casing 354 using the interface device 304. In some embodiments, the line mounted device 302 may not include the spool 352. For example, a spool device may be disconnected from the line mounted device 302, such as the spool device and line mounted device 302 are mount to the interface device 304. The spool device may be refilled with core material and be reused on other line mounted devices.

Figure 7:
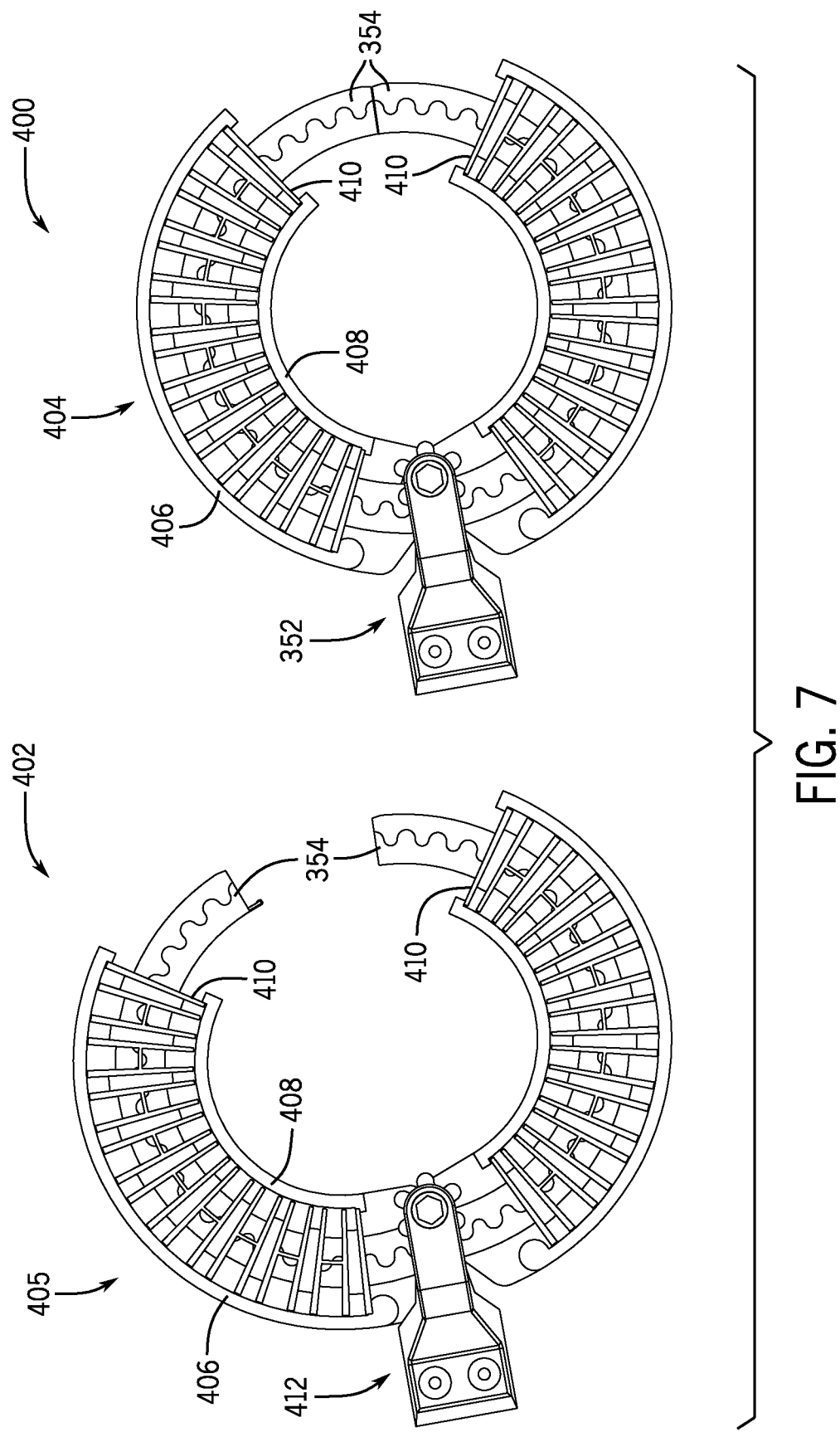
FIG. 7 is a top view diagram of a non-gapped current transformer assembly at an opening and closing positions, in accordance with an embodiment.

FIG. 7 is a top view diagram of a non-gapped current transformer assembly 400 at an opening position 402 and a closing position 404, respectively. The non-gapped current transformer assembly 400 includes the magnetic core casing 354 positioned inside a housing 405 that includes an outer wall 406 and an inner wall 408. The housing 405 may be opened in a comparable way as the magnetic core casing 354. Multiple bobbins 410 may be mounted on the magnetic core casing 354 and inside the housing 405. The housing 405 is used to enclose and protect the magnetic core casing 354 and the bobbins 410. Each bobbin 410 may include multiple segments on which conductive material (e.g., metal wires) may be wound to construct the secondary winding 370. The non-gapped current transformer assembly 400 also include a gear driving assembly 412 that may also be used to drive the magnetic core casing 354 to rotate.

Figure 8:
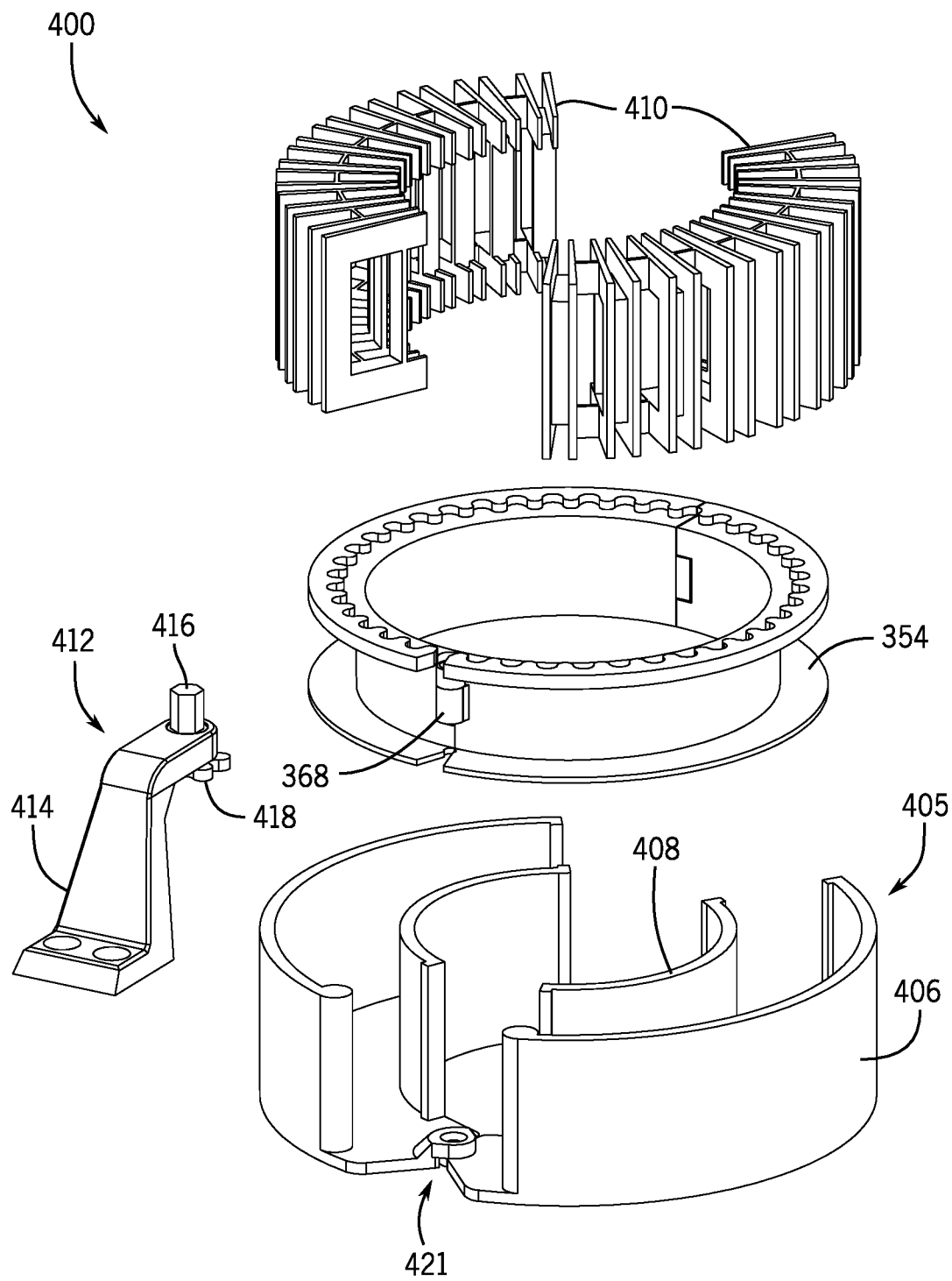
FIG. 8 is an exploded view diagram of the non-gapped current transformer assembly of FIG. 7, in accordance with an embodiment.

FIG. 8 is an exploded view diagram of the non-gapped current transformer assembly 400 of FIG. 7. The outer wall 406 and the inner wall 408 of the housing 405 are in open positions. The housing 405 includes a second hinge 421 used to open the outer wall 406 and the inner wall 408 in a comparable way as using the hinge 368 to open the magnetic core casing 354. The gear driving assembly 412 includes a body 414 to support a shaft 416 and a driving gear 418. The shaft 416 may transfer a rotational force to drive the driving gear 418 to rotate, therefore driving the magnetic core casing 354 to rotate.

Figure 9:
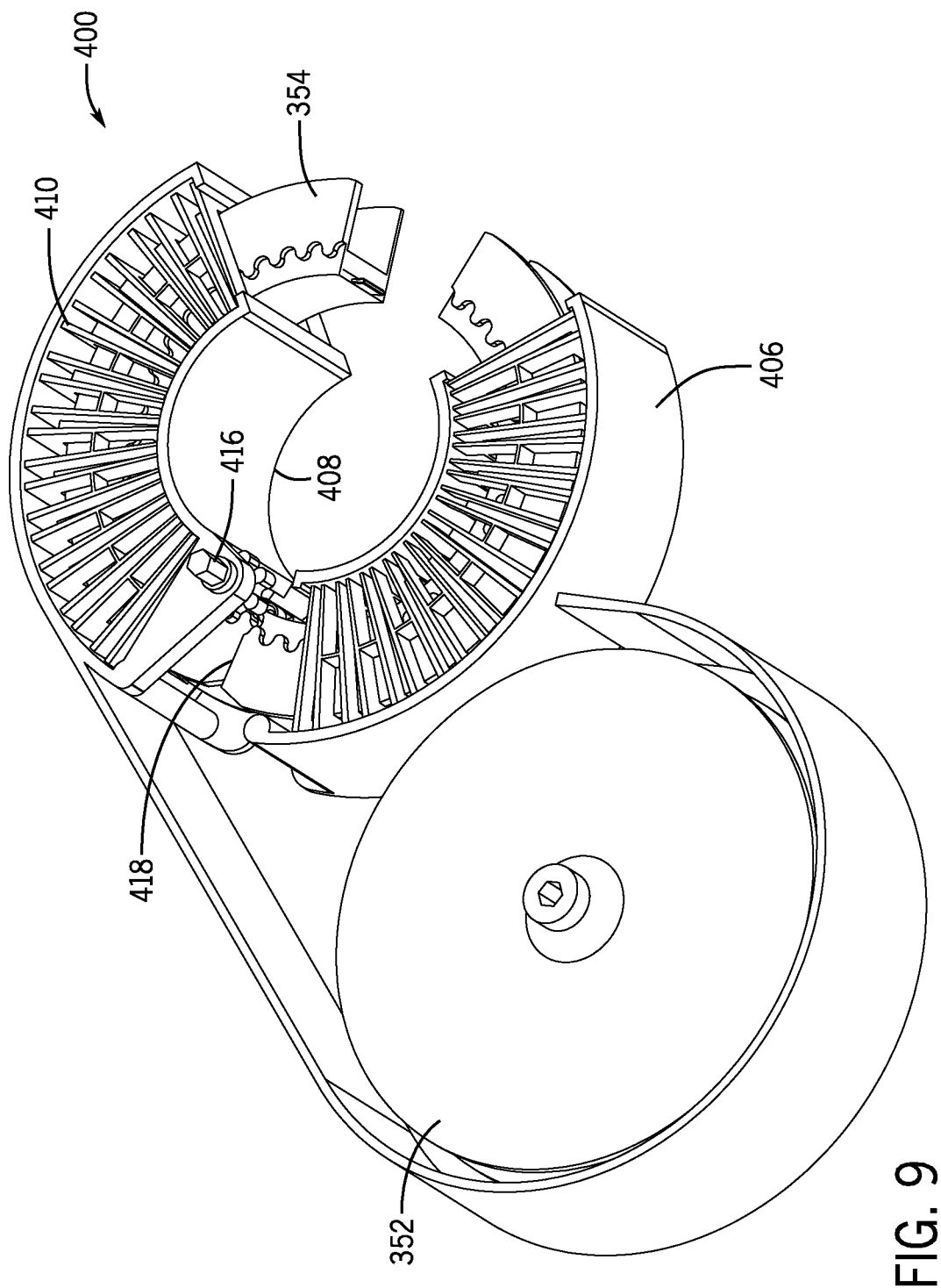
FIG. 9 is a three-dimensional (3D) view diagram of a current transformer assembly of FIG. 7 and a spool, in accordance with an embodiment.

FIG. 9 is a three-dimensional (3D) view diagram of the non-gapped current transformer assembly 400 and the spool 352. In an embodiment (e.g., a lab test), a user may use a tool (e.g., screwdriver) to drive the shaft 416 to rotate the driving gear 418, causing the magnetic core casing 354 to rotate to pull core material out of the spool 352 and wind the core material into the magnetic core casing 354.

It should be noted that the embodiments described above with regard to FIG. 7-9 do not include the magnetic core material (e.g., ribbon or stripe wound on the magnetic core casing 354) and secondary winding material (e.g., metal wire wound on the bobbins 410). Additionally, a primary conductor (e.g., conductor 204) is not installed in these embodiments for simplicity purpose.

Figure 10:
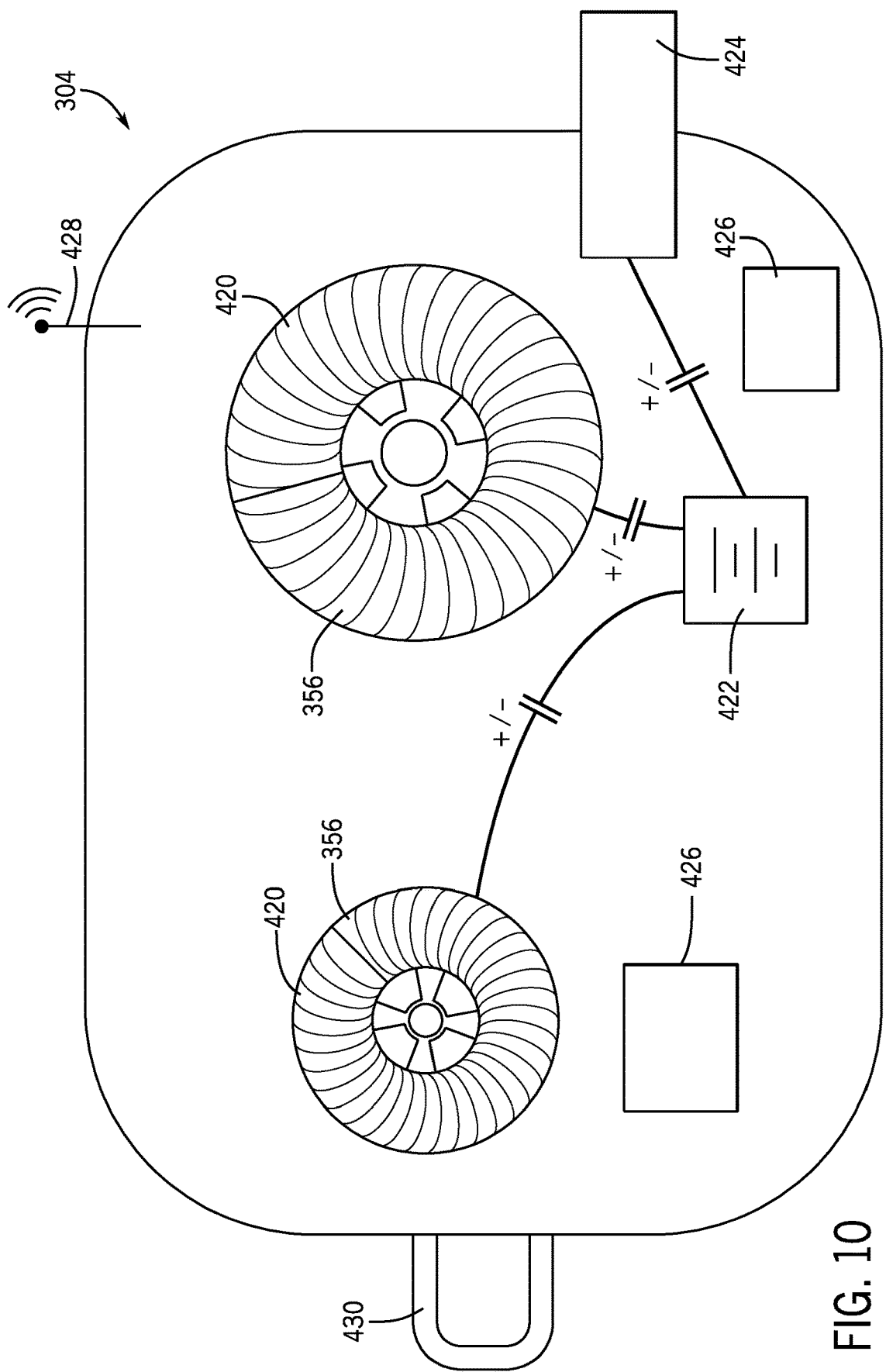
FIG. 10 is a block diagram of an interface device of the mounting system of FIG. 5, in accordance with an embodiment.

FIG. 10 is a block diagram of the interface device 304 of the mounting system 300 of FIG. 5. The interface device 304 includes winding gears 356 coupled to motors 420, which are electrically coupled to a power unit 422 (e.g., rechargeable battery). The power unit 422 may electrically couple with a connector 424 that may be used to connect to an external power source to power (e.g., recharge) the power unit 422. The interface device 304 also include a second locking mechanism including one or more locking units 426 that may be used to engage and lock to the first locking mechanism (including the locking components 380) of the line mounted device 302. The interface device 304 further includes a wireless transceiver 428 to communicate with the wireless control device 306. Additionally, the interface device 304 includes a connecting component 430 (e.g., hot stick loop connection) used to connect to a tool or device (e.g., hot stick 310).

During the installation of the line mounted device 302, the user 308 may connect (e.g., using the connecting component 430) the hot stick 310 to the interface device 304, use the hot stick 310 to position the interface device 304 close to the line mounted device 302, send a command from the wireless control device 306 to the wireless transceiver 428 to remotely lock the interface device 304 to the line mounted device 302 using the locking units 426 and the locking components 380. The locking may include aligning and engaging (e.g., coupling) the driving gears 356 to the winding gear 360 and the casing winding gear 364 respectively, such that rotating the driving gears 356 may rotate the winding gear 360 and the casing winding gear 364. After locking, the user 308 may use the wireless control device 306 to cause the power unit 422 to power the motors 420 to rotate the driving gears 356, which drives the winding gear 360 and the casing winding gear 364 to rotate, thereby pulling the core material 374 out of the spool 352 and winding the core material 374 into the magnetic core casing 354 to construct the magnetic core.

It should be noted that the components described above with regard to the interface device 304 are examples and the interface device 304 may include additional or fewer components relative to the illustrated embodiment. In some embodiments, only one motor 420 is used (e.g., coupled to one of the winding gears 356). In some embodiments, the interface device 304 does not include a connector 424.

Figure 11:
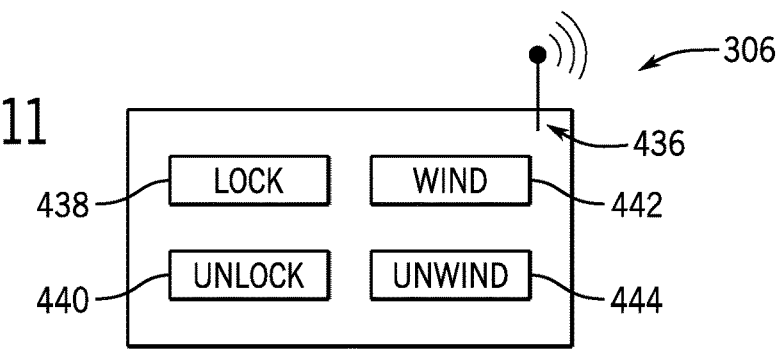
FIG. 11 is a block diagram of a wireless control device of the mounting system of FIG. 5, in accordance with an embodiment.

FIG. 11 is a block diagram of the wireless control device 306 of the mounting system of FIG. 5. The wireless control device 306 includes a transceiver 436, a lock button 438, an unlock button 440, a wind button 442, and an unwind button 444. After positioning the interface device 304 close to the line mounted device 302, the user 308 may press the lock button 438 to generate a lock command, which is transmitted via the transceiver 436 to the wireless transceiver 428 of the interface device 304. The locking command may cause the interface device 304 to lock to the line mounted device 302. The user 308 may then press the wind button 442 to generate a winding command to cause the power unit 422 to power the motors 420 to rotate the driving gears 356, which drives the winding gear 360 and the casing winding gear 364 to rotate, thereby pulling the core material 374 out of the spool 352 and winding the core material 374 into the magnetic core casing 354 to construct the magnetic core.

In a reverse case (e.g., unwinding the core material 374 from the magnetic core casing 354), the user may press the unwind button 444 to generate an unwinding command to cause the power unit 422 to rotate the driving gears 356 reversely, which drives the winding gear 360 and the casing winding gear 364 to rotate reversely, thereby rewind the core material 374 from the magnetic core casing 354. Afterwards, the user 308 may press the unlock button 440 to disengage the interface device 304 from the line mounted device 302.

It should be noted that the components described above with regard to the wireless control device 306 are examples and the wireless control device 306 may include additional or fewer components relative to the illustrated embodiment. For example, the wireless control device 306 may include a display unit allowing certain measurement data transmitted from the line mounted device 302 to be displayed on the display unit.

With the preceding in mind, and to provide further familiarity with the mounting system 300 described above, FIGS. 12 and 13 illustrate methods of using the interface device 304 and the wireless control device 306 to perform certain operations associated with the powerline-mounted devices. In certain embodiments, the interface device 304 and the wireless control device 306 may be put into a combo system to facilitate users (e.g., utility workers) to install the powerline-mounted devices.

Figure 12:
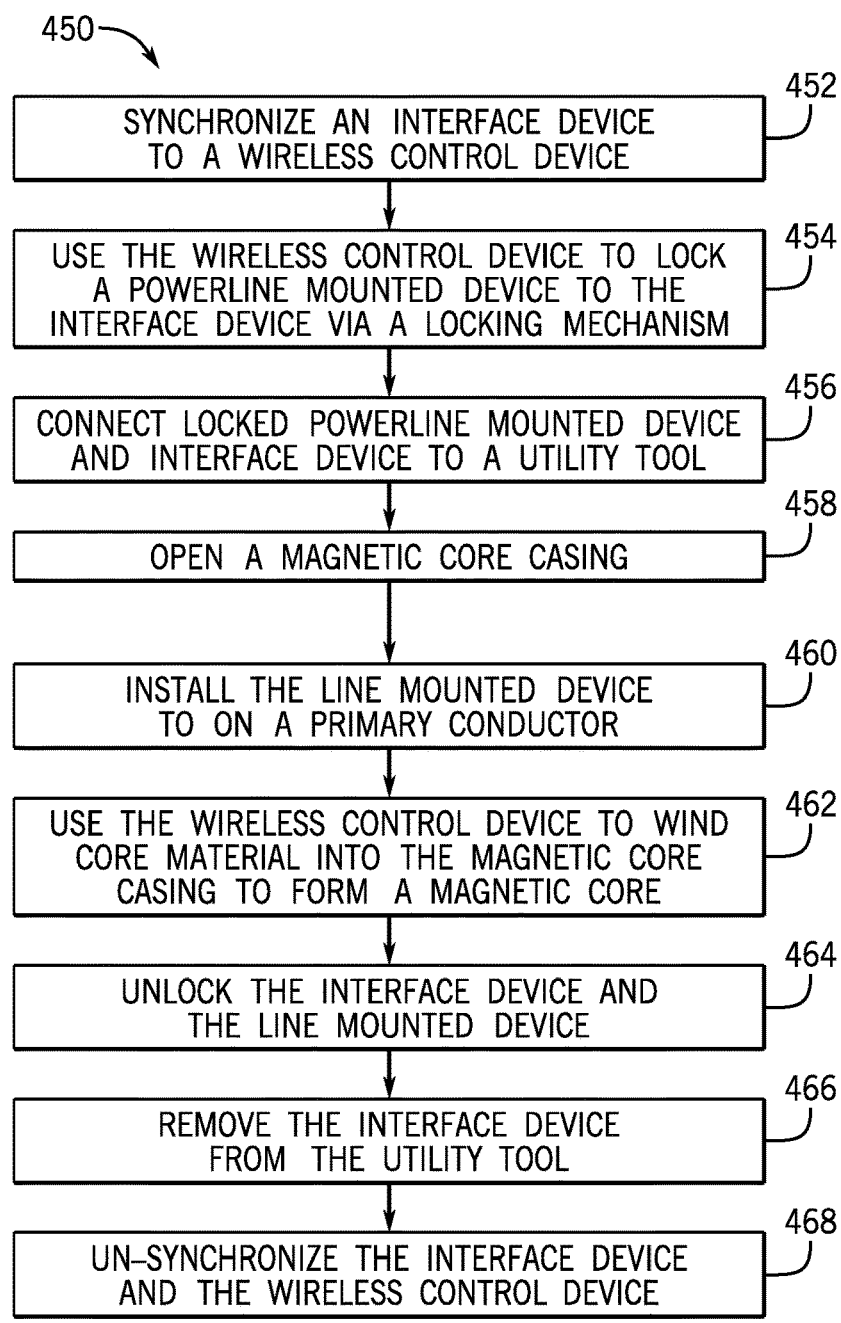
FIG. 12 is a flow diagram of a process for installing the powerline-mounted device of FIG. 5, in accordance with an embodiment.

FIG. 12 is a flow diagram of a process 450 for installing the line mounted device 302 of FIG. 5. Although the process 450 described in FIG. 2 is described in a particular order, it should be noted that the process 450 may be performed in any suitable order and is not limited to the order presented herein. It should also be noted that although each processing block is described below in the process 450 as being performed by the computing system 10, other suitable computing systems may perform the methods described herein.

At block 452, a user (e.g., utility worker, lineman) may synchronize an interface device (e.g., interface device 304) to a wireless control device (e.g., wireless control device 306). For instance, the user may synchronize (e.g., using a synchronization button on the interface device or on the wireless control device) a first transceiver (e.g., wireless transceiver 428) of the interface device 304 to a second transceiver (e.g., transceiver 436) of the wireless control device. The synchronization may enable the user to use the wireless control device 306 to remotely control the operations of the interface device 304 that may subsequently control the operations (e.g., winding or unwinding) of the line counted device 302.

At block 454, the user may connect a powerline-mounted device (e.g., line mounted device 302) to the interface device and use the wireless control device (e.g., by pressing the lock button 438) to lock the powerline-mounted device to the interface device via a locking mechanism (e.g., including the locking components 380 and locking units 426).

After locking, at block 456, the user may connect the locked powerline-mounted device and the interface device to a utility tool (e.g., hot stick 310) used to work on energized conductors (e.g., high-voltage electric power lines). For example, the user may connect the hot stick 310 to the interface device 304 via the connecting component 430.

At block 458, the user may open a magnetic core casing (e.g., magnetic core casing 354). In some embodiments, the user may open the magnetic core casing using a hinge (e.g., hinge 368). The user may also open the other relevant components of the line mounted device 302, such as the outer wall 406 and inner wall 408 of the housing 405 (e.g., using the second hinge 421). Furthermore, the user may slide the bobbins 410 onto the magnetic core casing 354 and mount the magnetic core casing 354 with the bobbins 410 inside the housing 405. In this step, the bobbins 410 may be preloaded with the secondary winding material.

With opened magnetic core casing and other relevant components, at block 460, the user may install the line mounted device to on a primary conductor (e.g., conductor 204) and close the magnetic core casing. The primary conductor may be energized during the installation.

At block 462, the user may use the wireless control device (e.g., by pressing the wind button 442 of the wireless control device 306) to wind core material (e.g., core material 374 made by magnetic ribbon or strip) into the magnetic core casing to construct a magnetic core. For instance, the user may press the wind button 442 to cause the power unit 422 to power the motors 420 to rotate the driving gears 356, driving the winding gear 360 and the casing winding gear 364 to rotate, thereby pulling the core material 374 out of the spool 352 and winding the core material 374 into the magnetic core casing 354 to construct the magnetic core.

At block 464, the user may unlock the interface device and the line mounted device. For example, the user may press the unlock button 440 of the wireless control device to unlock the interface device 304 from the line mounted device 302.

After unlocking, at block 466, the user may remove the interface device from the utility tool. At block 468, the user may un-synchronize the interface device and the wireless control device. For example, the user may press a un-synchronization button on the wireless control device or the interface device.

Figure 13:
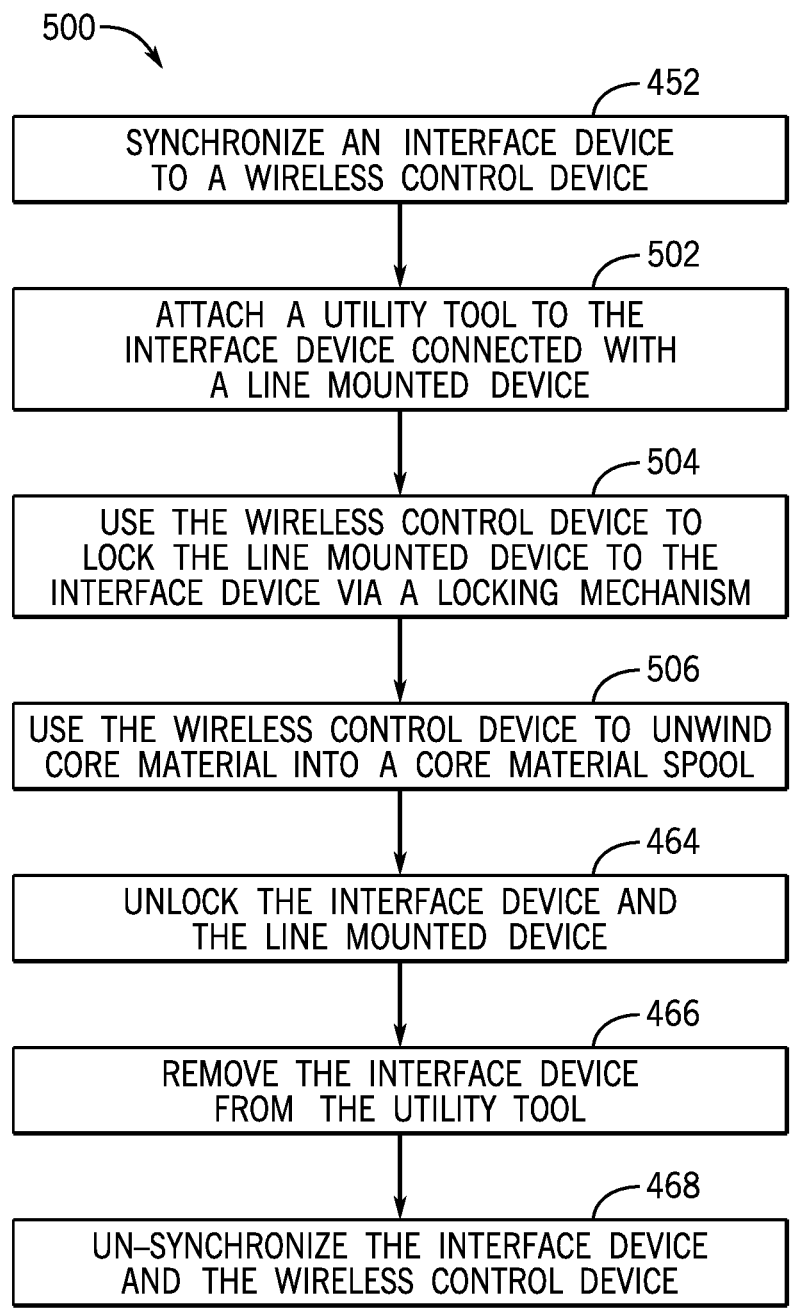
FIG. 13 is a flow diagram of a process for removing the powerline-mounted device of FIG. 5, in accordance with an embodiment.

FIG. 13 is a flow diagram of a process 500 for removing the line mounted device 302 of FIG. 5. Although the process 500 described in FIG. 2 is described in a particular order, it should be noted that the process 500 may be performed in any suitable order and is not limited to the order presented herein. It should also be noted that although each processing block is described below in the process 500 as being performed by the computing system 10, other suitable computing systems may perform the methods described herein.

The first step of the process 500 is the same as the block 452 used in the process 450 of FIG. 12, including synchronizing the interface device (e.g., interface device 304) to the wireless control device (e.g., wireless control device 306). After synchronization, at block 502, the user may attach a utility tool (e.g., hot stick 310) to the interface device connected with the line mounted device 302. At block 504, the user may use the wireless control device to lock the line mounted device 302 to the interface device via a locking mechanism (e.g., the locking components 380 and locking units 426).

At block 506, the user may use the wireless control device to unwind the core material into a core material spool (e.g., spool 352). For example, the user may press the unwind button 444 to rotate the magnetic core casing 354 and the spool 352 reversely and rewind the core material 374 (e.g., magnetic ribbon or stripe) back to the spool 352 from the magnetic core casing 354.

After rewinding the core material, the subsequent steps of the process 500 are the same as the blocks 464, 466, and 468, such as unlocking the interface device and the line mounted device, removing the interface device from the utility tool (e.g., hot stick), and un-synchronizing the interface device and the wireless control device.

Figure 14:
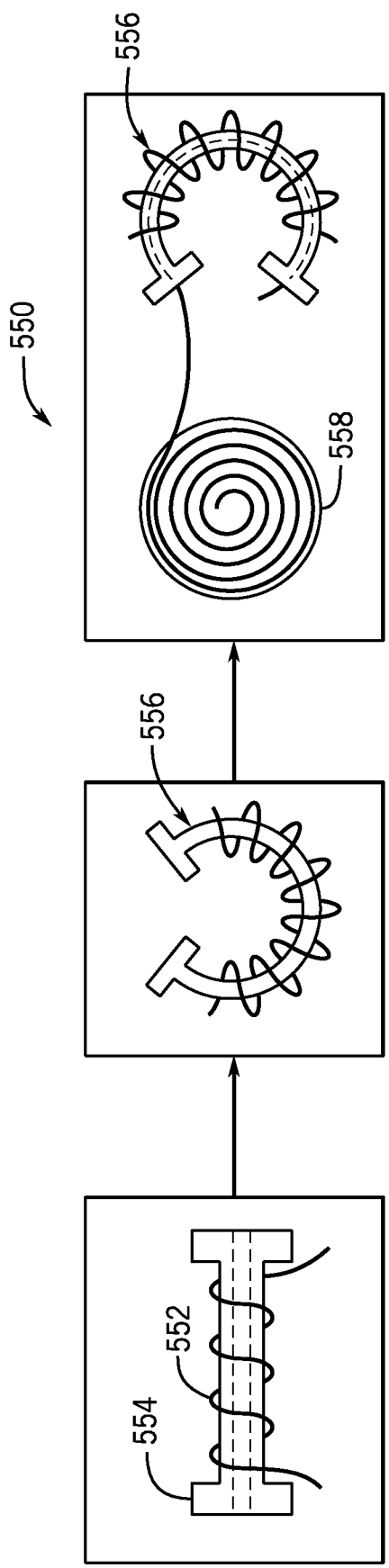
FIG. 14 is a schematic diagram of a method for winding non-gapped magnetic core with a toroid winder, in accordance with an embodiment.

In some embodiments, alternative methods may be used to construct or install non-gapped powerline-mounted devices. FIG. 14 is a schematic diagram of a method 550 for winding non-gapped magnetic core with a toroid winder. For instance, a conductive wire 552 may be wound on an axial bobbin winder 554 and then bent into a toroid winder 556. Magnetic core material 558 (e.g., magnetic ribbon or stripe) may be wound into the toroid winder 556 to construct a magnetic core.

The method 550 may provide an alternative method to create a current transformer or inductor with the toroid winder 556. One of the advantages of assembling the current transformer or inductor with the method 550 is that using the axial bobbin winder 554 may have less error counting turns than a toroid winder and may wind the magnetic core material faster.

Figure 15:
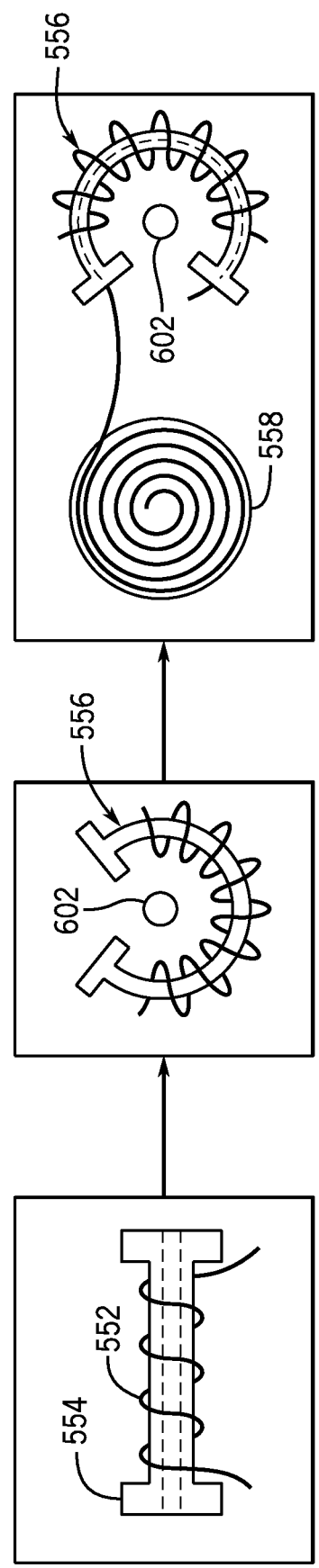
FIG. 15 is a schematic diagram of a method for installing a non-gapped transformer or inductor on a fixed conductor, in accordance with an embodiment.

FIG. 15 is a schematic diagram of a method 600 for installing a non-gapped transformer or inductor on a fixed conductor 602. The method 600 may be modified from the method 550 of FIG. 14 by bending the bobbin winder 554 around the fixed conductor 602.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . ." or "step for [perform]ing [a function] . . . ," it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A device configured to be mounted on a conductor of an electric power delivery system, comprising:
   a spool configured to store magnetic core material; and
   a hinged core casing configured to be clamped around the conductor, wherein the hinged core casing is coupled to the spool and configured to rotate to cause the magnetic core material to be extracted from the spool and wind around the hinged core casing to produce a non-gapped magnetic core.

2. The device of claim 1, wherein the device comprises a transformer configured to harvest electric energy from a magnetic field produced by the conductor, wherein the transformer comprises the hinged core casing and one or more bobbins mounted around the hinged core casing, wherein the one or more bobbins are wound with conductive material forming a secondary winding configured to harvest the electric energy.

3. The device of claim 2, wherein the transformer comprises a current transformer.

4. The device of claim 1, wherein the hinged core casing is configured to be clamped around the conductor, and wherein the conductor is a powerline of the electric power delivery system.

5. The device of claim 1, comprising first winding gear coupled to the hinged core casing and configured to rotate the hinged core casing to cause the magnetic core material to be extracted from the spool and wind around the hinged core casing to produce the non-gapped magnetic core.

6. The device of claim 2, comprising:
   a housing configured to enclose and protect the hinged core casing and the one or more bobbins; and
   a first locking mechanism configured to lock the housing onto or off from an interface device used to mount the device on the conductor of the electric power delivery system.

7. The device of claim 6, wherein the first locking mechanism of the device is configured to lock the housing onto or off from the interface device, wherein the interface device comprises a second locking mechanism and second winding gear, and wherein the interface device is configured to mount the device on the conductor at least in part by:
   locking the device to the interface device using the first locking mechanism and the second locking mechanism;
   installing the device to the conductor by opening the hinged core casing via a first hinge and the housing via a second hinge;
   closing the hinged core casing via the first hinge and the housing via the second hinge;
   winding magnetic core material extracted from the spool onto the hinged core casing to produce the non-gapped magnetic core using the first winding gear and the second winding gear; and
   unlocking the device to the interface device using the first locking mechanism and the second locking mechanism.

8. The device of claim 7, wherein locking and unlocking the device to the interface device comprise using a wireless control device synchronized to the interface device.

9. The device of claim 7, wherein winding the magnetic core material comprises:
   using the first winding gear of the device to engage the second winding gear of the interface device; and
   using third winding gear coupled to the spool of the device to engage fourth winding gear of the interface device;
   wherein at least the second winding gear is coupled to a motor configured to drive the second winding gear to rotate.

10. The device of claim 6, wherein the housing comprises an inner wall and an outer wall, and wherein the inner wall, the outer wall, and the hinged core casing respectively comprise an opening configured to allow installing the device to the conductor by opening inner wall, the outer wall, and the hinged core casing.

11. The device of claim 1, comprising a driving assembly comprising:
    a driving gear configured to drive the hinged core casing to rotate; and
    a shaft configured to transfer an external rotational force to a driving force to drive the driving gear to rotate.

12. A system, comprising:
    a device configured to be installed on a conductor of an electric power delivery system, comprising:
        a transformer configured to harvest electric energy from a magnetic field produced by the conductor, comprising:
            a non-gapped magnetic core;
            a core casing configured to enclose the non-gapped magnetic core;
            one or more bobbins mounted on the core casing, wherein the one or more bobbins are wound with conductive material forming a secondary winding; and
            a spool configured to store magnetic core material;
    an interface device configured to connect a utility tool to the device to facilitate installing the device; and
    a wireless control device communicatively coupled to the interface device and configured to remotely control operations of the interface device.

13. The system of claim 12, wherein the device comprises one or more winding gears configured to extract the magnetic core material from the spool and wind the magnetic core material around the core casing to produce the non-gapped magnetic core.

14. The system of claim 13, wherein the interface device comprises one or more driving gears configured to drive the one or more winding gears to rotate.

15. The system of claim 14, wherein the interface device comprises one or more motors coupled to the one or more driving gears and configured to drive the one or more driving gears to rotate.

16. The system of claim 12, wherein the device comprises an energy storage unit configured to store electric energy harvested from the magnetic field produced by the conductor, and wherein the stored electric energy is used to power a load.

17. The system of claim 12, where the utility tool comprises a hot stick.

18. The system of claim 12, wherein the operations of the interface device comprise:
    synchronizing the interfaced device and the wireless control device;
    locking the device to the interface device;
    winding the magnetic core material around the core casing;
    unwinding the magnetic core material from the core casing into the spool;
    unlocking the device from the interface device; and
    un-synchronizing the interfaced device and the wireless control device.

19. A method for installing a transformer around a conductor, the method comprising:
    placing an openable core casing around the conductor;
    closing the openable core casing; and
    winding a core material around the openable core casing to produce a non-gapped magnetic core of the transformer.

20. The method of claim 19, wherein the core material is wound around the openable core casing using a driving assembly, the driving assembly comprising:
    a driving gear configured to drive the openable core casing to rotate; and
    a shaft configured to transfer an external rotational force to a driving force to drive the driving gear to rotate.

21. The method of claim 19, wherein closing the openable core casing and winding the core material are performed via a wireless control device.

22. The method of claim 21, comprising:
    opening the openable core casing via the wireless control device;
    synchronizing an interface device to the wireless control device;
    locking the transformer to the interface device;
    unlocking the transformer from the interface device; and
    un-synchronizing the interface device from the wireless control device.

23. The method of claim 22, wherein opening the openable core casing comprises:
    opening the core casing via a first hinge; and
    opening a housing via a second hinge, wherein the housing is configured to enclose and protect the core casing.

24. The method of claim 22, comprising:
    locking the transformer to the interface device using a first locking mechanism of the interface device and a second locking mechanism of the transformer; and
    unlocking the transformer from the interface device using the first locking mechanism and the second locking mechanism.

25. A method for installing a transformer around a conductor, the method comprising:
    bending an axial bobbin around the conductor to form a toroid winder; and
    winding a core material into the toroid winder to produce a non-gapped magnetic core of the transformer.

26. The method of claim 25, wherein the toroid winder is wound with conductive material forming a secondary winding configured to harvest electric energy from a magnetic field produced by the conductor.

27. The method of claim 25, wherein the conductor is a fixed conductor.

* * * * *